(12) United States Patent
Koning et al.

(10) Patent No.: US 6,172,178 B1
(45) Date of Patent: Jan. 9, 2001

(54) CAR PARTS MADE FROM A POLYAMIDE COMPOSITION

(75) Inventors: Cornelis E. Koning, Schinnen; Johannes Tijssen, Beek, both of (NL)

(73) Assignee: DSM N.V., Heerlen (NL)

( * ) Notice: Under 35 U.S.C. 154(b), the term of this patent shall be extended for 0 days.

(21) Appl. No.: 09/394,048

(22) Filed: Sep. 13, 1999

Related U.S. Application Data

(63) Continuation of application No. PCT/NL98/00147, filed on Mar. 12, 1998.

(30) Foreign Application Priority Data

Mar. 13, 1997 (NL) .................................................. 1005520

(51) Int. Cl.⁷ .......................... C08G 69/02; C08G 69/10; C08G 69/26; C08L 77/00
(52) U.S. Cl. .......................... 528/310; 528/170; 528/322; 528/330; 528/332; 528/335; 528/346; 528/349; 525/432; 525/435; 525/436; 428/411.1; 428/474.4
(58) Field of Search ..................................... 528/170, 349, 528/335, 310, 332, 346, 330, 322; 525/432, 435, 436; 428/411.1, 474.4

(56) References Cited

U.S. PATENT DOCUMENTS

| 4,255,560 | * | 3/1981 | Meyer et al. | 528/349 |
|---|---|---|---|---|
| 4,731,421 | * | 3/1988 | Hoppe et al. | 528/349 |
| 4,794,158 | * | 12/1988 | Hasuo et al. | 528/349 |
| 5,360,891 | | 11/1994 | Wenzel et al. | 528/335 |
| 5,696,202 | | 12/1997 | Torre | 528/335 |

FOREIGN PATENT DOCUMENTS

| 0 619 336 | 10/1994 | (EP) . |
|---|---|---|
| 0 725 101 | 8/1996 | (EP) . |

\* cited by examiner

*Primary Examiner*—P. Hampton-Hightower
(74) *Attorney, Agent, or Firm*—Pillsbury Madison & Sutro Intellectual Property Group

(57) ABSTRACT

Car part made from a polyamide composition wherein the polyamide substantially consists of 60–99 wt. % units derived from aliphatic dicarboxylic acids and diamines and the remaining chain units are derived from cycloaliphatic dicarboxylic acid(s) and an aliphatic diamine or cycloaliphatic diamine(s) and an aliphatic dicarboxylic acid.

12 Claims, No Drawings

CAR PARTS MADE FROM A POLYAMIDE COMPOSITION

This is a Continuation of International Appln. No. PCT/NL98/00147 filed Mar. 12, 1998.

FIELD OF THE INVENTION

The invention relates to car parts made from a polyamide composition, the polyamide of which substantially consists of units derived from aliphatic dicarboxylic acids and diamines.

BACKGROUND OF THE INVENTION

In the automotive sector, metal parts are increasingly being replaced by polymeric materials for the purpose of, for example, reducing the car's weight and preventing corrosion. High requirements are however imposed on polymeric materials used in car parts. The polymeric materials must have excellent mechanical properties, for example high stiffness, fatigue resistance, tenacity and impact resistance and little creep. The materials must have a high heat deflection temperature. A high oxidative stability and chemical resistance to, for example oils and greases, are also requirements that the material employed must meet. Limited moisture absorption is important with respect to obtaining a high dimensional stability of the car part. Depending on the place in which the car part will ultimately be used, the polymer composition will have to exhibit some of the properties mentioned above to a greater extent than others and/or will have to possess additional properties. If the part is to be used in for example the bodywork (bumpers, wings, wheel housings, door panels, spoilers, etc.) a combination of sufficient stiffness and impact resistance and an excellent surface quality of the polymer composition will require special attention. The heat deflection temperature is an extremely important factor for both parts of the bodywork and for parts under the bonnet. Parts of the bodywork are exposed to high temperatures, for example during painting at high temperatures. Parts under the bonnet are constantly exposed to the high heat of the engine. Examples of such parts are air inlet manifolds and radiator end caps. The heat deflection temperature (HDT) is the temperature at which a rod made of the material in question shows a prescribed deflection when it is subjected to a certain flexural stress under three-point loading. Usually, a material cannot be used at temperatures above its heat deflection temperature because the material loses its strength and stiffness at this temperature.

Conventional polyamide materials, such as nylon 4.6 and nylon 6.6, which find wide application in car parts, do not satisfy all the aforementioned properties that are many times required for use in car parts. A drawback of nylon 6.6, for example, is that its heat deflection temperature is not high enough for many applications in car parts under the motorhood. The aliphatic nylon 4.6 does not show this limitation. A drawback of polyamide 4.6, however, is that it absorbs a relatively large amount of moisture, as a result of which its dimensional stability is in many cases insufficient.

SUMMARY OF THE INVENTION

The aim of the invention is a car part made from a polyamide composition that possesses a good balance of properties.

This aim is achieved in that 1 to approx. 40 wt. % of the chain units of the aliphatic polyamide of the composition is replaced by units derived from one or more cycloaliphatic dicarboxylic acids and an aliphatic diamine or one or more cycloaliphatic diamines and an aliphatic dicarboxylic acid.

It has been found that, as a result of the incorporation of the chain units based on cycloaliphatic dicarboxylic acids or cycloaliphatic diamines, the heat deflection temperature of, for example, nylon 6.6 is sufficiently increased and the moisture absorption of, for example, nylon 4.6 is sufficiently reduced without any concessions being made with respect to the mechanical and processing properties.

A most surprising advantage of the car parts according to the invention is that the incorporation of the chain units based on cycloaliphatic dicarboxylic acid or cycloaliphatic diamine in nylon 6.6 results in a considerable increase in tenacity. Another surprising advantage of the car parts according to the invention is that the incorporation of the chain units based on cycloaliphatic dicarboxylic acid or cycloaliphatic diamine results in a considerable improvement of the polymer composition's flow behaviour at a normal processing temperature. This makes it easier to incorporate a higher proportion of reinforcing materials, for example glass fibres, in the polyamide, and no thermal degradation of the polyamide takes place during the compounding and parts can be injection-moulded under less rigid conditions.

DETAILED DESCRIPTION OF THE PREFERRED EMBODIMENTS

It has surprisingly been found that reinforced, for example glass-fibre-reinforced, parts according to the invention show a much higher tenacity. A high tenacity, being the product of the tensile strength and the elongation at break, is advantageous because it substantially reduces the risk of the part breaking, for example during mounting in the vehicle.

The polyamide composition of the car parts according to the invention contains a polyamide whose main chain consists for 60–99 wt % of units derived from aliphatic dicarboxylic acids and diamines and is characterised in that the remaining chain units are derived from one or more cycloaliphatic dicarboxylic acids and an aliphatic diamine or one or more cycloaliphatic diamines and an aliphatic dicarboxylic acid.

The cycloaliphatic dicarboxylic acids are preferably cyclohexyl dicarboxylic acids. Suitable cyclohexyl dicarboxylic acids are for example 1,3-cyclohexyl dicarboxylic acid or 1,4-cyclohexyl dicarboxylic acid. Most preferable is 1,4-cyclohexyl dicarboxylic acid because then the invention is most effective.

The cycloaliphatic diamines are preferably cyclohexyl diamines. Suitable cyclohexyl diamines are for example 1,3-cyclohexyl diamine or 1,4-cyclohexyl diamine. Most preferable is 1,4-cyclohexyl diamine because the invention is then most effective.

Suitable aliphatic dicarboxylic acids are for example dicarboxylic acids with 1 to 16 methyl groups in their chain, more preferably 2 to 10 methyl groups. Most preferable is adipic acid. The alkyl groups are preferably linear; a small degree of branching, such that the crystallisation behaviour and other properties are not too adversely affected, is however allowed. The copolyamide of polyamide 6.6 and hexamethylene-1,4-cyclohexyl diamine is incidentally known from J. Pol. Sc. A-1, 8 3089–3111 (1970). The special possibilities and outstanding properties for use in car parts were however not noticed.

Suitable aliphatic diamines are for example diamines with 2 to 16 methyl groups in their chain. Diamines with 4 to 10 methyl groups in their chain are preferred. The most preferable are 2-methylpentane diamine, 1,4-tetramethylene diamine and 1,6-hexamethylene diamine.

The main chain preferably substantially consists of tetramethylene adipamide or hexamethylene adipamide units and combinations thereof.

The proportion of the chain units derived from a cycloaliphatic dicarboxylic acid and an aliphatic diamine or a cycloaliphatic diamine and an aliphatic dicarboxylic acid is at least 1 wt. % and at most 40 wt. %. In the case of less than 1 wt. % the invention has insufficient effect, in the case of more than 40 wt. % the crystallisation behaviour is so adversely affected and the melting point becomes so high that processing by means of for example injection-moulding becomes virtually impossible. The latter objection can incidentally be met by incorporating units of a third polyamide, generally with a lower melting point, for example units derived from an $\alpha,\omega$-amino acid. The $\alpha,\omega$-amino acid is preferably chosen from the group comprising 6-aminocaproic acid, 11-aminoundecanoic acid and 12-aminododecanoic acid or mixtures hereof.

What proportion is the most preferable will have to be determined for each individual case. In general, the preferred proportion of the units derived from the cycloaliphatic dicarboxylic acid or cycloaliphatic diamine will lie between 2 and 35 wt. %, most preferable will be 10 to 25 wt. %. The aliphatic diamine or dicarboxylic acid is generally the same as in the repeated units of which the main chain consists substantially.

In addition to the polyamide of which 99–60 wt. % of its main chain consists of units derived from aliphatic dicarboxylic acids and diamines and 1 to 40 wt. % consists of units derived from one or more cycloaliphatic dicarboxylic acids and an aliphatic diamine or from one or more cycloaliphatic diamines and an aliphatic dicarboxylic acid and optionally from $\alpha,\omega$-amino acids, the polyamide composition of the car part according to the invention optionally contains a minor amount of a different polymer for the purpose of modifying the properties of the polyamide composition.

The polyamide composition of the car part according to the invention preferably contains an amount of reinforcing materials, for example glass fibres. These reinforcing materials are generally used in an amount of 10–60 wt. %, relative to the total composition, preferably in an amount of 20–50 wt. %. Most preferable is 25–45 wt. %. In the case of glass fibres the fibres' length and diameter generally determine the reinforcing effect in the part. The ultimate length of the fibre in the part is generally determined by the compounding method and the moulding technique. Short glass-fibre-reinforced materials are generally obtained through extrusion, after which the extrusion product can be subjected to the usual shaping techniques, preferably injection-moulding. Glass fibres with a length of 2.5–5 mm are generally used for injection-moulding, which results in an ultimate glass fibre length of 150–400$\mu$. Long fibre-reinforced materials are generally produced by means of pultrusion, for example in the form of sheets. The length of the glass fibre here is the same as that of the shape obtained. This reinforced composition is subsequently subjected to a shaping step, for example injection-moulding or pressing. The copolyamide's good flow behaviour then presents the advantage that complete incorporation of the continuous fibres is obtained.

The copolyamide for the parts according to the invention can be obtained with the aid of copolycondensation methods known per se. Often use is made of a two-step process in which, in the first step, the polycondensation of the initial dicarboxylic acids and diamines and optionally amino acids or lactams is initiated at elevated pressure, at a temperature of about 200–300° C., optionally in the presence of a polycondensation catalyst. In that case, the monomers may or may not be present in the form of the corresponding nylon salts. The pressure is generally kept between about 1 and 2 MPa and the water formed in the polycondensation is removed. After a reaction time of between ½ and 3 hours the temperature is raised while the pressure is simultaneously relieved, so that the low-molecular copolyamide obtained remains in the melt. This melt is subsequently condensed further for 2–5 hours, at a temperature above the copolyamide's melting point, in a vacuum, optionally with a nitrogen vent.

This after-condensation is generally continued until a copolyamide with a sufficiently high molecular weight for injection-moulding applications in car parts is obtained. Usually a viscosity number, VN, of at least 130 ml/g, more preferably at least 160 ml/g and even more preferably at least 180 ml/g, is then desired, so that the part obtained after processing has a viscosity number of at least 120, preferably at least 130 ml/g, even more preferably at least 150 ml/g. The viscosity numbers are determined according to ISO 307, using a solution of 0.5 g of copolyamide in 100 ml of 90 wt. % formic acid. Instead of in the melt, the after-condensation step can also be carried out in the solid phase, under an inert gas atmosphere, optionally in a vacuum and/or in the presence of water vapour. The required after-condensation time is then generally about 5 to 60 hours, depending on the viscosity number desired. The duration of the after-condensation is also dependent on the chosen temperature, which lies between approx. 200° C. and approx. 10° C. below the copolyamide's melting point. The required reaction times are also dependent on whether or not a catalyst is present. Suitable polycondensation catalysts that are known per se are for example phosphoric acid, boric acid, triphenylphosphite and substituted phenylphosphites.

It is also possible to prepare the copolyamide by using as a starting material the individual homopolyamides that are obtained each time a single diamine and a single dicarboxylic acid are subjected to polycondensation. Mixing the homopolyamides in the melt results in a block or random copolyamide, depending on the duration of mixing. When low-molecular homocopolyamides are used as a starting material it is advantageous, after mixing in the melt, to subject the composition obtained to after-condensation in the solid phase. Such after-condensation is preferably carried out in an inert gas atmosphere, i.e. with the exclusion of oxygen, whether or not at reduced pressure, and whether or not in the presence of water vapour.

The above process for preparing the copolyamide however presents the drawback that the homopolyamide based on the cycloaliphatic dicarboxylic acid in some cases has a very high melting point, as a result of which processing with standard melt-mixing equipment may involve problems. Therefore it is also possible to use as a starting material the monomers of the polyamide based on the cycloaliphatic dicarboxylic acid or cycloaliphatic diamine and the other homopolyamide.

The polyamide composition optionally contains the additives commonly used for polyamides, for example stabilisers, pigments, processing aids, for example mould-release agents, flame retardants and fillers. In many cases a combination of a mineral filler and fibre reinforcement will be used to increase the car parts' dimensional stability.

The invention will be further elucidated by means of the following, non-limiting, examples.

EXAMPLE I

Preparation of a polyamide 4.6/4.1,4-cyclohexyl dicarboxylic acid copolymer.

The following chemicals were used in the preparation:

1,4-cyclohexyl dicarboxylic acid[1] (CHDA) cis:trans= 80:20 from Eastman, adipic acid from Aldrich,

[1] Compositions containing either 100 % trans or 100% cis instead of 80/20 cis:trans cyclohexane dicarboxylic acid show corresponding properties.

1,4-tetramethylene diamine as an aqueous, approx. 80 wt. % solution, from Koey, JP, 1,6-hexamethylene diamine (HMDA).

The chemicals were used without further purification.

In a 2.4-liter reactor a solution was prepared under a flow of nitrogen, consisting of 363.62 g of 1,4-tetramethylene diamine solution (81 wt. % in water), 400 g of adipic acid and 100 g of 1,4-cyclohexyl dicarboxylic acid in 584 g of demineralised water. When all had dissolved, the reactor was slowly heated to 165° C. The pressure in the reactor was meanwhile kept at 0.2 MPa. Between 120° and 165° C. water was removed through distillation. When 589 ml of water had been removed through distillation, the reactor was closed and the temperature of the reaction mixture was raised to 205° C. and was kept at this temperature for 30 minutes. The pressure was 1.2 MPa. The reactor contents were subsequently drained, under pressure, into a vessel that was kept under nitrogen.

The prepolymer obtained above was ground and subsequently subjected to after-condensation under a 25/75 steam/nitrogen mixture at 250° C. for 48 hours. The after-condensate obtained was white and had a viscosity number (VN)=248 ml/g, measured for a 0.5 g/100 ml solution in 90 wt. % formic acid according to ISO 307, at 25° C. The melting point was 314–316° C.

EXAMPLE II

The process of Example 1 was used to obtain a 4.6/4.1, 4-cyclohexyl dicarboxylic acid (80/20 wt./wt. %) copolyamide.

This composition was used to injection-mould rod specimens (ISO R 527 type 1A) and to determine various mechanical properties. The injection-moulding was done with the aid of a 22-mm Arburg Allrounder at a melt temperature of 330° C. and a mould temperature of 120° C. The results are shown in Table 1.

TABLE 1

| Tensile test ISO-R537 | polyamide 4.6 | 4.6/4.CHDA (80/20) (Ex. I) |
|---|---|---|
| E-mod [MPa] | 3102 | 3603 |
| tensile stress at break [MPa] | 83 | 103 |

The copolyamide has a considerably higher modulus of elasticity, which is surprising given that differential scanning calorimetry (DSC) reveals a low crystallinity and a lower melting heat relative to polyamide 4.6 homopolymer, on the basis of which one would expect a lower stiffness.

EXAMPLE III

Preparation of polyamide 6.6/6.1,4-cyclohexyl dicarboxylic acid copolymers having different compositions.

The 6.6/6.CHDA.HMDA copolyamides were prepared in a two-step process, in which, in the first step, a prepolymerisation was carried out; this was followed by a solid-phase after-condensation step.

The prepolymerisation was carried out in a stirred 1.4-liter autoclave, heated by means of oil. 400 g of equimolar nylon salt was used as the starting material. The different compositions were prepared on the basis of weight percentages. 0.9×400=360 g of equimolar nylon 6.6 salt and 0.1×400=40 g of equimolar CHDA-HMDA salt was used to obtain a composition with a nylon 6.6/6.CHDA-HMDA (1.4-cyclohexyl dicarboxylic acid-hexamethylene diamine) ratio of for example 90/10. The salts were dissolved in 327.3 ml of demineralised water (55 wt. % aqueous salt solution).

Under a nitrogen flow, half of the required amount of demineralised water was added to the autoclave, heated to 70° C. (start up of stirrer), after which the salt was added and then the remaining amount of demineralised water. After half an hour the reactor was heated to 180° C. Between 180° C. and 200° C. more water was removed through distillation under atmospheric pressure. When 282.8 ml of water had been removed through distillation, the reactor was closed and the temperature of the reaction mixture was raised. This led to a pressure build-up of approx. 1.3 MPa and the reaction mixture's final temperature was about 200° C.

The reaction mixture was kept at this temperature for 30 minutes. Next, the reactor contents were drained under pressure into a vessel that was kept under nitrogen.

The prepolymer obtained above was ground and subsequently subjected to after-condensation under a 25/75 steam/nitrogen mixture at 240° C. for 22 hours.

The other compositions of the examples were synthetised in the same way, but in different nylon 6.6/6.CHDA-HMDA ratios and at different after-condensation temperatures and times.

Various thermal properties of these copolyamides were determined by differential scanning calorimetry at a scanning rate of 20° C./min. The measurements of the melting point ($T_{m,2}$), the glass transition temperature ($T_{g,2}$), the crystallisation temperature ($T_c$) and the melting and crystallisation enthalpies ($\Delta H_{m,2}$ and $\Delta H_c$) were carried out with the aid of a Perkin Elmer DSC 7. The melting point, the glass transition temperature and the enthalpies were determined from the second heating curve. The results are shown in Table 2.

TABLE 2

| Composition | $T_{m,2}$ (° C.) | $T_c$ (° C.) | $T_{g,2}$ (° C.) | $\Delta H_{m,2}$ (J/g) | $\Delta H_c$ (J/g) |
|---|---|---|---|---|---|
| Nylon 6.6 | 262.5 | 223.5 | 50.3 | 62.0 | −64.5 |
| 6.6/6.CHDA-HMDA (98/2) | 264.7 | 229.4 | 51.6 | 70.8 | −65.5 |
| 6.6/6.CHDA-HMDA (95/5) | 266.4 | 230.6 | 52.3 | 59.8 | −60.3 |
| 6.6/6.CHDA-HMDA (90/10) | 273.9 | 240.6 | 58.4 | 53.7 | −53.8 |
| 6.6/6.CHDA-HMDA (80/20) | 286.6 | 253.3 | 73.1 | 49.2 | −37.7 |
| 6.6/6.CHDA-HMDA (70/30) | 297.6 | 263.6 | 110.0 | 20.0 | −29.8 |
| 6.6/6.CHDA-HMDA (60/40) | 307.1 | 271.5 | — | 15.2 | −17.5 |

An unfilled 70/30 wt./wt. % 6.6/6.CHDA-HMDA polyamide was used for injection-moulding test specimens (ISO R 527, type 1A) for determining various mechanical properties. The injection-moulding was done with a 22-mm Arburg Allrounder at a melt temperature of 330° C. and a mould temperature of 120° C. The results are shown in Table 3.

TABLE 3

| Tensile test ISO-R537 | polyamide 6.6 | 6.6/6.CHDA (70/30) |
|---|---|---|
| Mod. of elasticity [MPa] | 3600 | 2909 |
| tensile stress at break [MPa] | 120 | 54 |
| elongation at break % | 23 | 124 |
| Izod [kJ/m$^2$] | 3 | 6 |

EXAMPLE IV

A polyamide 6.6, polyamide 6.6/6.CHDA (80/20 wt./wt. %) and polyamide 4.6 with 40 wt. % glass fibre, were used for injection-moulding specimens (ISO R 527, type 1A) to determine various properties. The polyamide 6.6 and polyamide 4.6 employed had about the same molecular weights. The injection-moulding was done with a 22-mm Arburg Allrounder under the conditions shown in Table 4. The results are shown in Table 4. The moisture absorption measurements were carried out using test specimens conditioned at 35° C. and a 90% relative humidity until equilibrium was reached.

"Polyamide 6.6 with glass fibre" was a composition consisting of polyamide 6.6 (injection-moulding quality) containing 40 wt. % glass fibre and a small amount of a common copper-based heat stabiliser.

"Polyamide 6.6/6.CHDA with glass fibre" was a composition consisting of a 80/20 wt./wt. % polyamide 6.6/6.1,4-cyclohexyl dicarboxylic acid containing 40 wt. % glass fibre and a small amount of a common copper-based heat stabiliser.

"Polyamide 4.6 with glass fibre" was a composition consisting of polyamide 4.6 containing 40 wt. % glass fibre and a small amount of a common copper-based heat stabiliser.

The weight percentages relate to the total composition.

TABLE 4

| | Polyamide 6.6 with glass fibre | Polyamide 6.6/6.CHDA with glass fibre | Polyamide 4.6 with glass fibre |
|---|---|---|---|
| Injection-moulding pressure (MP$_a$) | 131 | 122 | 116 |
| Melt temperature (° C.) | 305 | 314 | 315 |
| Mould temperature (° C.) | 80 | 120 | 120 |
| Tensile strength (MPa) ISO 527-1&2 | 205 | 214 | 216 |
| Elongation at break (%) ISO 527-1&2 | 2.54 | 3.21 | 2.74 |
| Impact resistance Charpy (unnotched) (kJ/m$^2$) ISO 179 | 102 | 107 | 102 |
| Heat deflection temperature HDT (° C.) | 250 | 265 | 280 |
| Viscosity number V$_n$ (ml/g) ISO 307 | 136 | 134 | 142 |
| Moisture absorption (wt. %) | — | 3.1 | 5.3 |
| Colour — discoloured o slight discolouration | — | o | o |

It should be noted that the composition containing the copolyamide shows better flow behaviour (the pressure required to fill the mould is lower while the difference between the melt temperature and the melting point is smaller) than the corresponding homopolyamide 6.6. Also surprising is the considerably higher tenacity (arithmetic product of the tensile strength and the elongation at break) of the 40 wt % glassfibre reinforced copolyamide relative to both polyamide 6.6 and polyamide 4.6, the viscosity numbers of the three polymers being virtually the same.

The test specimens produced from the glass reinforced copolyamide had a very good surface appearance in which the reinforcing glass fibres were not visible. For this reason parts made of the very rigid glassfibre reinforced copolyamide can also be used for autobody parts that are to be lackered and exposed.

So concluding from the results of table 4. Parts made from the composition containing the copolyamide according to the invention show improved dimensional stability, due to the lower water absorption, than parts made from polyamide 4.6.

The parts can withstand higher temperatures than parts based on polyamide 6.6. The parts can easier be processed, have an excellent surface, have a better tenacity, can better resist impact and show an improved or al least equal tensile strength, than parts based on polyamide 6.6 and polyamide 4.6, that already find widespread application in automotive parts.

What is claimed is:

1. Car part made from a polyamide composition, the polyamide of which substantially consists for 60–99 wt % of units derived from aliphatic dicarboxylic acids and diamines, wherein the remaining chain units are derived from one or more cycloaliphatic dicarboxylic acids and an aliphatic diamine or one or more cycloaliphatic diamines and an aliphatic dicarboxylic acid.

2. Car part according to claim 1, wherein the cycloaliphatic dicarboxylic acid is a cyclohexyl dicarboxylic acid and the cycloaliphatic diamine is a cyclohexyl diamine.

3. Car part according to claim 2, wherein the cyclohexyl dicarboxylic acid is 1,4-cyclohexyl dicarboxylic acid and the cyclohexyl diamine is 1,4-cyclohexyl diamine.

4. Car part according to any one of claims 1–3, wherein that the aliphatic dicarboxylic acids contain 2 to 16 methylene groups and the aliphatic diamines contain 4 to 16 methyl groups.

5. Car part according to any one of claims 1–3, where 2 to 35 wt. % of the chain units is derived from the cycloaliphatic dicarboxylic acid or cycloaliphatic diamine.

6. Car part according to claim 5, wherein 10 to 25 wt. % of the chain units is derived from the cycloaliphatic dicarboxylic acid or cycloaliphatic diamine.

7. Car part according to claim 1, wherein the aliphatic dicarboxylic acid is adipic acid and the aliphatic diamine has been chosen from the group comprising 1,6-hexamethylene diamine and 1,4-tetramethylene diamine or is a mixture thereof.

8. Car part according to claim 7, wherein units derived from an α,ω-amino acid are also present.

9. Car part according to claim 8, wherein the α,ω-amino acid has been chosen from the group comprising 6-aminocaproic acid, 11-aminoundecanoic acid and 12-aminododecanoic acid.

10. Car part according to any one of claims 1–3, wherein the polyamide composition contains 10–60 wt. % (relative to the total composition) reinforcing material.

11. Car part according to claim 10, wherein the polyamide composition contains 25–45 wt. % reinforcing material.

12. Car part according to claim 10, wherein the car part is produced by injection-moulding.

* * * * *